US011969772B2

(12) United States Patent
Delano

(10) Patent No.: US 11,969,772 B2
(45) Date of Patent: Apr. 30, 2024

(54) MOTORIZED DRAIN CLEANER

(71) Applicant: Franklin Delano, Seaford, NY (US)

(72) Inventor: Franklin Delano, Seaford, NY (US)

( * ) Notice: Subject to any disclaimer, the term of this patent is extended or adjusted under 35 U.S.C. 154(b) by 326 days.

(21) Appl. No.: 17/079,701

(22) Filed: Oct. 26, 2020

(65) Prior Publication Data

US 2022/0126333 A1 Apr. 28, 2022

(51) Int. Cl.

| | |
|---|---|
| ***B08B 9/047*** | (2006.01) |
| ***B08B 9/043*** | (2006.01) |
| ***B08B 9/045*** | (2006.01) |
| ***E03C 1/302*** | (2006.01) |

(52) U.S. Cl.

CPC ............ *B08B 9/047* (2013.01); *B08B 9/0436* (2013.01); *B08B 9/045* (2013.01); *E03C 1/302* (2013.01); *B08B 2209/04* (2013.01)

(58) Field of Classification Search

CPC ....... B08B 9/0436; B08B 9/045; B08B 9/047; B08B 2209/04; E03C 1/302; E03F 9/005

See application file for complete search history.

(56) References Cited

U.S. PATENT DOCUMENTS

| | | | | |
|---|---|---|---|---|
| 2,320,309 A * | 5/1943 | Smith | ..................... | E03F 9/005 15/104.33 |
| 5,056,176 A | 10/1991 | Belcher | | |
| 5,755,002 A | 5/1998 | Lacy | | |
| 10,329,753 B2 | 6/2019 | Thompson | | |
| 10,569,311 B2 | 2/2020 | Oberto et al. | | |
| 2017/0328053 A1 | 11/2017 | Clary | | |

FOREIGN PATENT DOCUMENTS

| | | | |
|---|---|---|---|
| DE | 20 2011 109 887 U1 * | 8/2012 | |
| EP | 1 375 763 A1 * | 1/2004 | |

* cited by examiner

*Primary Examiner* — Randall E Chin

(57) ABSTRACT

An article of manufacture for providing motorized drain cleaning and clearing is disclosed. The motorized drain cleaner includes a three ring aluminum frame surrounding a rotating drum containing a drain snake drum, the rotating drain snake drum being coupled to a multi-directional motor, an outside frame coupled to a pair of pivoting wheels at its base, the outside frame having a plurality of frame support arms connecting a handle to a base about the pair of wheels and a control panel between the plurality of frame support arms about the handle, a pair of pivot support arms coupled between the three ring aluminum frame and the plurality of frame support arms of the outside frame permitting the three ring aluminum frame and the drain snake drum contained therein to pivot upward and downward about the pivot support arms, the drain snake drum coupled to a feed neck that is connected to a drain snake outlet coupled to the three ring frame supporting the drain snake outlet about a center of rotation of the rotating snake drum, and a drain snake cable having a cutting tool coupled to an outward end and being coupled to the drain snake drum such that rotation of the drain snake drum within the three ring frame causes the drain snake cable to rotate accordingly, the drain snake cable arranged to pass through the drain snake outlet as the drain snake cable exits the drain snake drum.

10 Claims, 9 Drawing Sheets

MOTORIZED DRAIN CLEANER

TECHNICAL FIELD

This application relates in general to an article of manufacture for providing a plumbing tool, and more specifically, to an article of manufacture for providing motorized drain cleaning and clearing.

BACKGROUND

Plumbers and technicians have used rotating drain line cleaners to pass a rotating cutting tool through a drain line that has become blocked in order to clear the line from any debris and root growth that is preventing the drain line from emptying. Machines that provide the rotating cutting tools on the end of a rotating snake line are utilized to cut their way through the clogs. Getting these machines to and from locations where access to the drain line can be a difficult task. Controlling the operation of the rotating cutting tool while viewing, and feeding the rotating snake line into the clogged drain line, observing the ongoing progress of the rotating snake line as is moved into the drain line, and starting and stopping the motor as needed all a the same time is also challenging. All of these efforts may be performed in dark, wet, and small spaces that make the coordinated actions of the operator while in this environment all the more challenging.

Therefore, a need exists for an article of manufacture for providing motorized drain cleaning and clearing according to the present invention. The present invention attempts to address the limitations and deficiencies of existing system according to the principles and example embodiments disclosed herein.

SUMMARY

In accordance with the present invention, the above and other problems are solved by providing an article of manufacture for providing motorized drain cleaning and clearing according to the principles and example embodiments disclosed herein.

In one embodiment, the present invention is an article of manufacture for providing motorized drain cleaning and clearing according to the present invention. An article of manufacture for providing motorized drain cleaning and clearing is disclosed. The motorized drain cleaner includes a three ring aluminum frame surrounding a rotating drum containing a drain snake drum, the rotating drain snake drum being coupled to a multi-directional motor, an outside frame coupled to a pair of pivoting wheels at its base, the outside frame having a plurality of frame support arms connecting a handle to a base about the pair of wheels and a control panel between the plurality of frame support arms about the handle, a pair of pivot support arms coupled between the three ring aluminum frame and the plurality of frame support arms of the outside frame permitting the three ring aluminum frame and the drain snake drum contained therein to pivot upward and downward about the pivot support arms, the drain snake drum coupled to a feed neck that is connected to a drain snake outlet coupled to the three ring frame supporting the drain snake outlet about a center of rotation of the rotating snake drum, and a drain snake cable having a cutting tool coupled to an outward end and being coupled to the drain snake drum such that rotation of the drain snake drum within the three ring frame causes the drain snake cable to rotate accordingly, the drain snake cable arranged to pass through the drain snake outlet as the drain snake cable exits the drain snake drum.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 2:
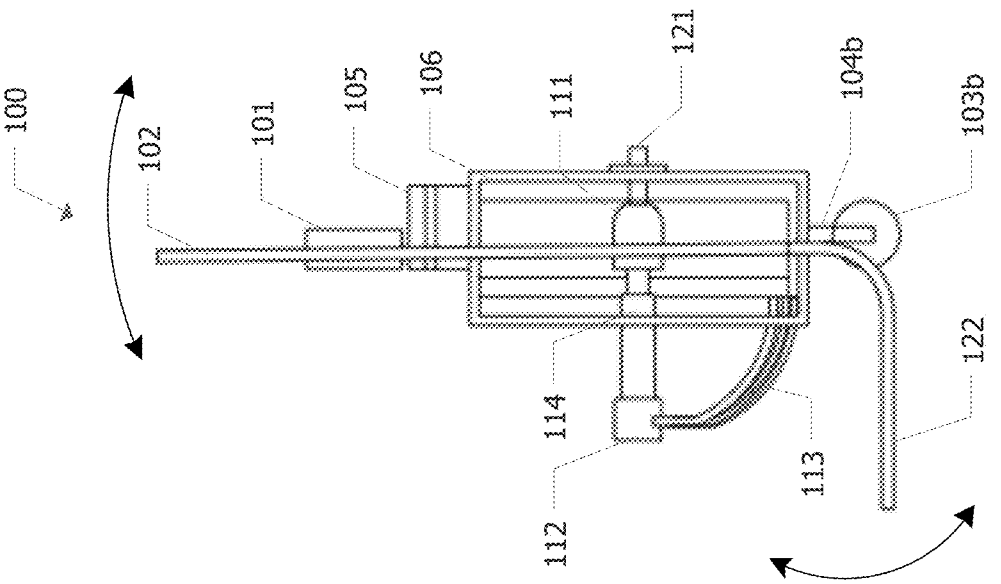
FIG. 2 illustrates an example embodiment of a side view of an article of manufacture providing motorized drain cleaning and clearing according to the present invention.

This application relates in general to an article of manufacture for providing a plumbing tool, and more specifically, to an article of manufacture providing motorized drain cleaning and clearing according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "worker," and "user" refer to an entity, e.g. a human, using the motorized drain cleaner for providing drain cleaning and clearing associated with the invention. The term user herein refers to one or more users.

The term "invention" or "present invention" refers to the invention being applied for via the patent application with the title "Motorized Drain Cleaner." Invention may be used interchangeably with snake cable and drain cleaner.

Figure 1:
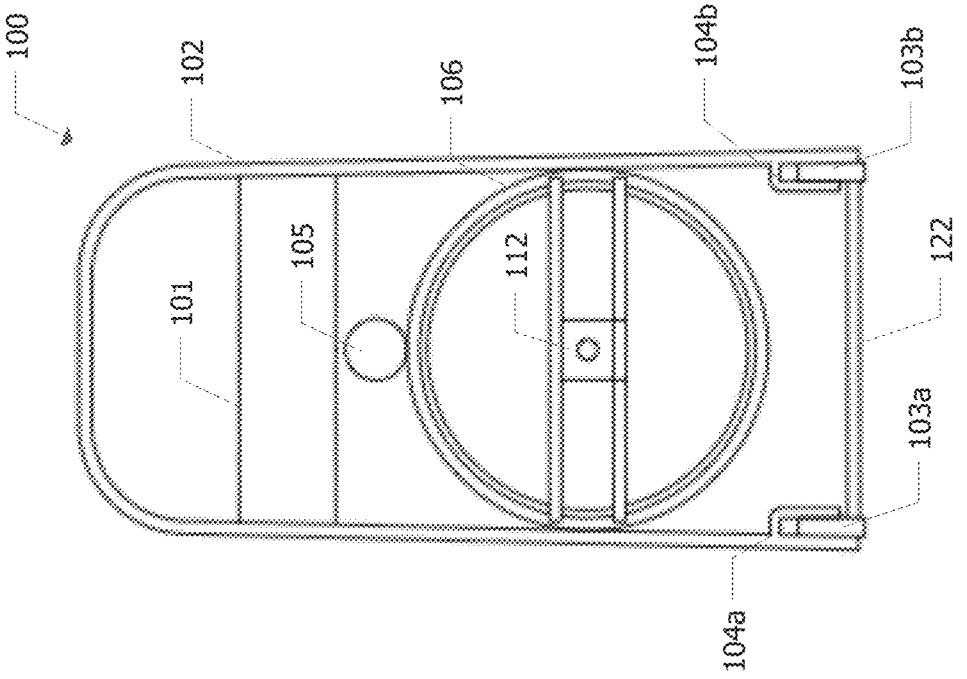
FIG. 1 illustrates an example embodiment of a rear view of an article of manufacture providing motorized drain cleaning and clearing according to the present invention.

In general, the present disclosure relates to an article of manufacture for providing a plumbing tool. To better understand the present invention, FIG. 1 illustrates an example embodiment of a rear view of an article of manufacture providing motorized drain cleaning and clearing according to the present invention. The motorized drain cleaner 100 consists of a control panel 101, a machine frame 102, a pair of machine wheels 103 attached to corresponding machine shocks 104, an electric motor 105, and a drain snake drum 106. The electric motor 105 rotates causing a belt and pulleys to spin a drain snake cable with a detachable cutting tool (not shown) on its end.

The cutting tool and the drain snake cable are fed into a clogged pipeline to clear the clog. The electric motor 105 rotates causing the belt and pulleys to rotate the drain snake outlet shaft 114 about a rotating shaft 121. The drain snake cable rotates through and exits the motorized drain cleaner 100 through a feed neck 112 and is controlled by the electric motor 105. The drain snake cable is slowly pushed through the drainpipe by hand as the user pulls the rotating drain snake cable from within the drain snake drum 106 and pushes it into the drainpipe. The cutting tool attached to the drain snake cable rotates when the electric motor 105 spins the cable, permitting it to cut through clog-causing objects within the drainpipe.

The machine frame 102 includes a frame base 122 that couples to the machine frame 102 about the machine wheels 103 located on either side of the motorized drain cleaner 100. The pair of machine wheels 103*a-b* are connected to the machine frame 102 by corresponding machine shocks 104 coupled to either side of the machine frame 102. The entire machine frame 102 may pivot about the machine wheels 103 to lift the frame base 122 off the ground as the motorized drain cleaner 100 is moved to and from the drainpipe access point.

The belt and pulleys connect the drain snake outlet shaft 114 to the electric motor 105 using a lower pulley 111 located at an inner end of the drain snake outlet shaft 114 and directly below the electric motor 105. The outer end of the drain snake outlet shaft 114 connects the feed neck 112 to the drain snake outlet shaft 114 and permits the drain snake cable to exit the drain snake drum 106. When the motorized drain cleaner 100 is not in use, the drain snake cable is stored within the drain snake drum 106.

In a preferred embodiment, the control panel 101 comprises an ignition key, a forward and reverse switch for the electric motor 105, a speed control for the RPM of the electric motor 105, on/off switch for a forward-facing LED light, a connection to accept a 48-volt battery or a GFI protected AC power plug for connecting to an extension cord, an AC to 42V transformer, a wireless or wired connection to a foot pedal motor activation switch with supporting circuit to generate an electric motor 105 enable/disable signal, and a GPS location tracker.

In a preferred embodiment, the electric motor 105 is a 42-volt powered motor of varying sizes. The electric motor 105 may be powered using either a battery (not shown) or an electrical cable (not shown) that is connected to a standard 110V AC power source. The 42V electric motor 105 may receive its power via the ordinary transformer within the control panel 101 when an AC power source is used.

The electric motor 105 is operated using the foot switch (not shown) that activates the electric motor 105 when depressed and stops the electric motor 105 when released. The user may therefore easily engage the drain snake cable and its cutting tool to rotate when desired. The foot switch is connected to the electric motor 105 using a control signal wire (not shown). The foot switch also may be wirelessly connected to the electric motor 105 using an RF signal. The foot pedal is within a waterproof enclosure.

The motorized drain cleaner 100 also may have the front-facing LED light source coupled to the machine frame 102 and powered by the electrical source powering the electric motor 105 to illuminate the work area around the drainpipe access point as needed. The motorized drain cleaner 100 may also include a GPS tracking device (not shown) that obtains a position of the motorized drain cleaner 100 itself that may be used with online maps and similar resources to estimate distances between the machine and other locations. Additionally, the GPS will allow the owner of the motorized drain cleaner 100 to locate their machine at any time, i.e. when they are lost or stolen.

The motorized drain cleaner 100 may be made in different sizes and power configurations for various embodiments. Each one of these embodiments are 110 V machines which have transformers to bring AC voltage down to DC voltage between 36 V-48 V. All of the embodiments function exactly the same. The difference between the embodiments relates to the size of the drain snake drum 106 and drain snake cable it can hold.

These embodiments are also capable of adding battery supply. All of the embodiments of the motorized drain cleaner 100 are made for providing safety to technicians and bystanders. All our power supplies are ground fault receptacle extension cords. All of the power on each unit is low voltage for technicians and bystanders of electrocution. The control panel 101 has several indicating lights (not shown) when power is brought to the control panel 101. A green indicator light which will allow the technician to see there is power to the unit. The rest of the control panel 101 must be activated by a key switch (not shown) which will power the total machine. The control panel 101 has a forward and reverse switch for the motor, a switch for a forward facing light, has an air switch for operating the machine. Also, the control panel 101 has a remote switch pedal to do the same functions. the control panel 101 has a dual USB port for iPad and smartphones to provide camera assistance. The control panel 101 has an outlet supply 110 V which works off the ground fault supply and can be used for drills, saws and lights etc. Additional details regarding the control panel 101 and its dashboard enclosure 701 are disclosed below in reference to FIGS. 7*a-e*.

Figure 4:
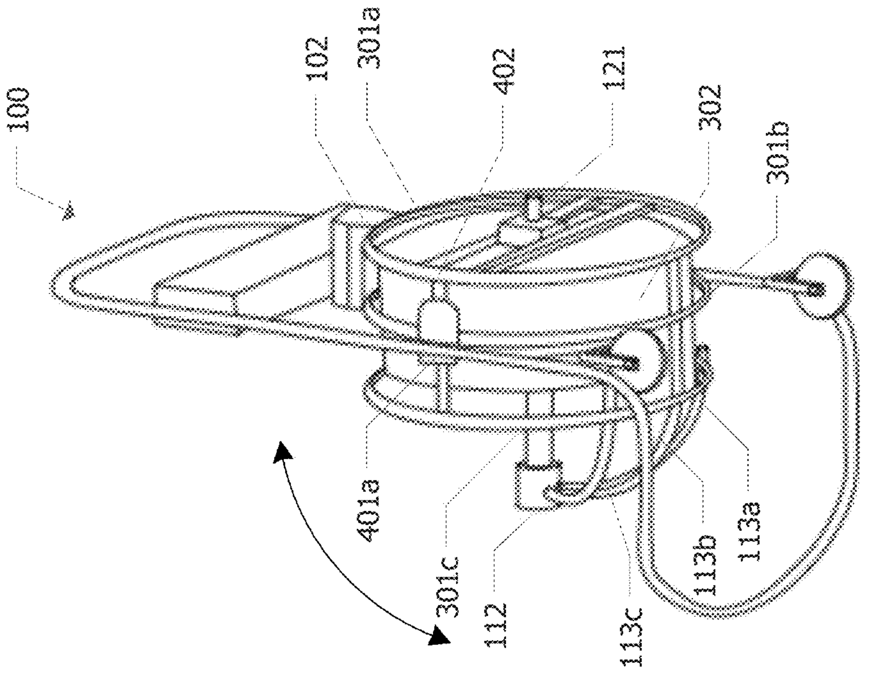
FIG. 4 illustrates another example embodiment of a bottom side view of an article of manufacture providing motorized drain cleaning and clearing according to the present invention.
Figure 3:
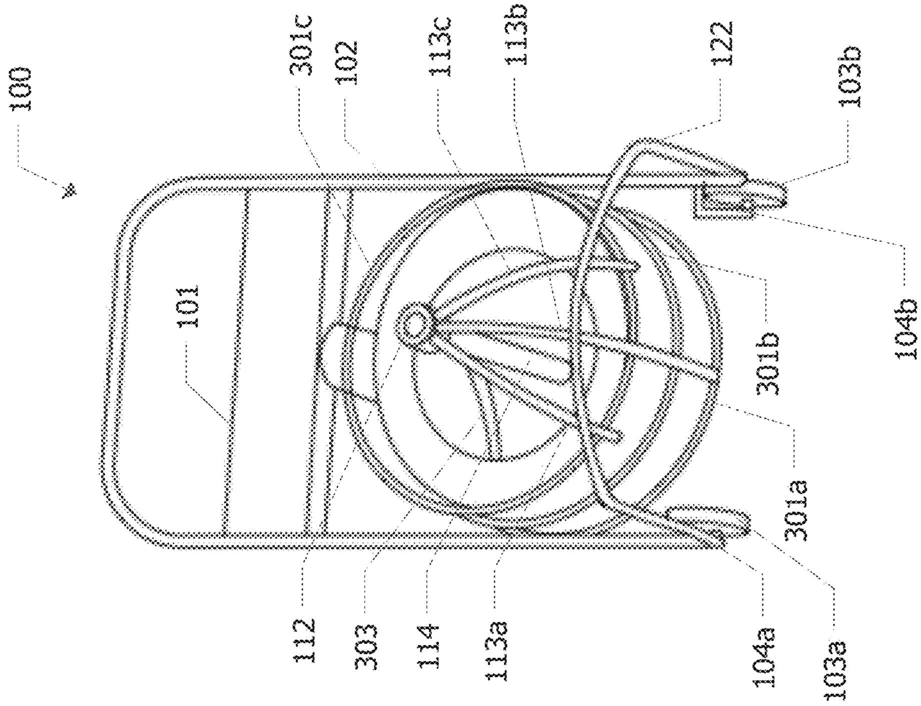
FIG. 3 illustrates an example embodiment of a front bottom view of an article of manufacture providing motorized drain cleaning and clearing according to the present invention.

The motorized drain cleaner 100 are designed and built to provide safety to technicians and bystanders while in operation. Safety is provided in part by the use low voltage motors. The motorized drain cleaner 100 is made of aluminum for light weightlifting up and down stairwells, thus making it easier for the technicians to maneuver. Also, the drain cleaner drums 106 are encased by three rings of aluminum framing 301*a-c* as shown in FIG. 3 to protect the technician from a spinning drum 106. The motorized drain cleaner 100 pivots up and down as shown in FIG. 4 which is for the technicians to work with cable above a floor. Prior art machines typically are 100% stationary and are exposed. Prior art drums are belt driven on the outside of the drum which may be a hazard. The present invention provides led lights to light up the work area for the technician. The key switch that provides power to the motorized drain cleaner 100 also provides a measure of safety preventing others from operating the motorized drain cleaner 100 when the technician is not present. The addition of a remote control foot pedal provides technicians with a means of operating the machine in a safe manner.

FIG. 2 illustrates an example embodiment of a side view of an article of manufacture providing motorized drain cleaning and clearing according to the present invention. This embodiment shows the drain snake outlet shaft 114 coupled to three snake outlet supports 113*a-c* at a center end of the drain snake outlet shaft 114 and the various points on the drain snake drum 106. To move the motorized drain cleaner 100 using the pair of machine wheels 103, a user pulls back on the machine frame 102 above the control panel 101 causing the machine frame 102 to pivot about the machine wheels 103 and lift the frame base 122 off of the ground.

In a preferred embodiment all the components of the machine frame 102 and frame base 122 may be made using No. 6061 aluminum tubing and aircraft aluminum which has been tempered for hardness. The machine frame 102 design is a housing of 3 circular tubing of aluminum to form a set of frame rings 301 surrounding the drain snake drum 106. The front housing also supports the feed neck 112 which has attachments for the automatic drain snake cable feed to slide in and out of the drain snake drum 106. The machine frame 102 also houses an electric motor 105 which supplies power to the drain snake drum 106. The machine frame 102 also contains a lower pulley 111 that connects the drain snake drum 106 to the electric motor 105 using a belt. A drain snake outlet shaft 114 is coupled to the lower pulley 111 mechanism which in turn connects from the electric motor 105 to the drain snake outlet shaft 114. A sprocket (not shown) permits a user to remove the drain snake drum 106 for easy access to change the cable.

FIG. 3 illustrates an example embodiment of a front bottom view of an article of manufacture providing motorized drain cleaning and clearing according to the present invention. The view of the motorized drain cleaner 100 in FIG. 3 highlights the components within the drain snake drum 106 and its connection between the feed neck 112 and a set of three frame rings 301*a-c*. The feed neck 112 is located at an outer end of the drain snake outlet shaft 114 and is supported by the set of three frame rings 301. The leftmost and rightmost snake outlet supports 113 are coupled to the front most frame rings 301*a* and the center snake outlet support 113*b* is connected to all three frame rings 301*a-c* as it runs the length of the drum walls 302 coupled to the inner portion of the three frame rings 301*a-c*.

A rotating drain snake device 303 is coupled to the drain snake outlet shaft 114 to direct the drain snake cable to the feed neck 112 as the drain snake drum 106 rotates.

FIG. 4 illustrates another example embodiment of a bottom side view of an article of manufacture providing motorized drain cleaning and clearing according to the present invention. The view of the motorized drain cleaner 100 shown in FIG. 4 highlights the machine wheels 103 and the machine shocks 104 connections to the machine frame 102 and the drain snake drum 106 pivoting connection to the machine frame 102. The machine frame 102 can pivot downward about a pivot drum pivot 402 that is attached to the frame rings 301 by pivot support arms 401. A pivot support arm 401 is located on opposite sides of the machine frame 102 and drain snake drum 106 to support the drain snake drum 106. The drum pivot 402 permits the drain snake drum 106, and thus the feed neck 112, to rotate toward the floor for lower floor drains or to pivot 40 degrees upward for all plumbing lines higher than floor level.

The outer part of the machine frame 102 that holds the drain snake drum assembly 106 is a heavier aluminum frame that supports the drum pivot arms 402 of the drain snake drum housing 106. The outer machine frame 102 has machine shock absorber forks 104*a-b* to hold the machine wheels 103 allowing shock absorption from stairs, curbs, entryways, etc. to prevent damage to the machine or to a customers' property. In some embodiments of the motorized drain cleaner 100, the machine frame 102 has fork and machine shock assemblies 104 with power-motored machine wheels 103 that can power the control panel 101 forward and reverse while walking using controls located on the control panel 101.

Figure 5:
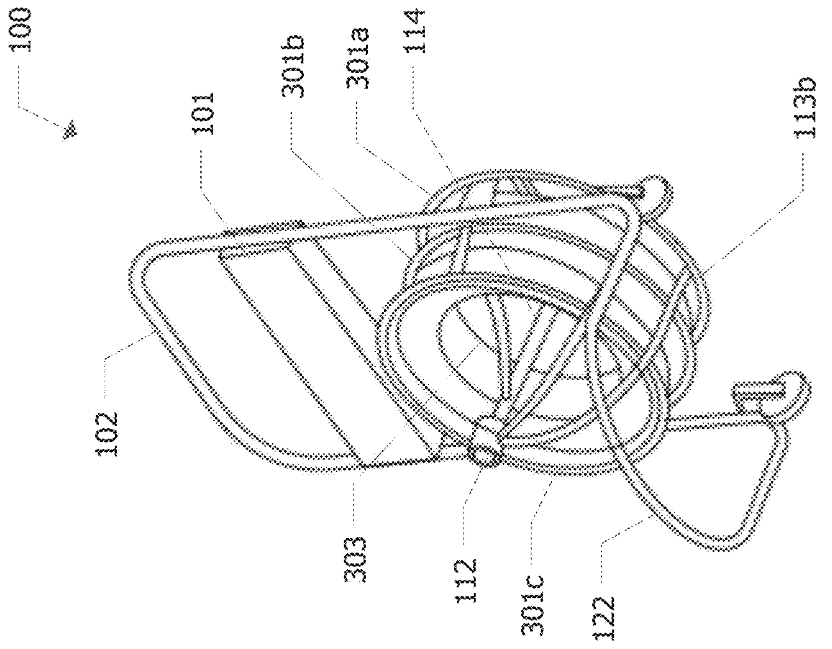
FIG. 5 illustrates an example embodiment of an article of manufacture providing motorized drain cleaning and clearing according to the present invention.

FIG. 5 illustrates an example embodiment of an article of manufacture providing motorized drain cleaning and clearing according to the present invention. The view of the motorized drain cleaner 100 in FIG. 5 again highlights the connection between the machine frame 102 and the machine wheels 103 by the machine shocks 104 and highlights the rotating drain snake device 303 coupled to the drain snake outlet shaft 114 while the three snake outlet supports 113*a-c* are between the frame rings 301 and the feed neck 112.

Figure 6:
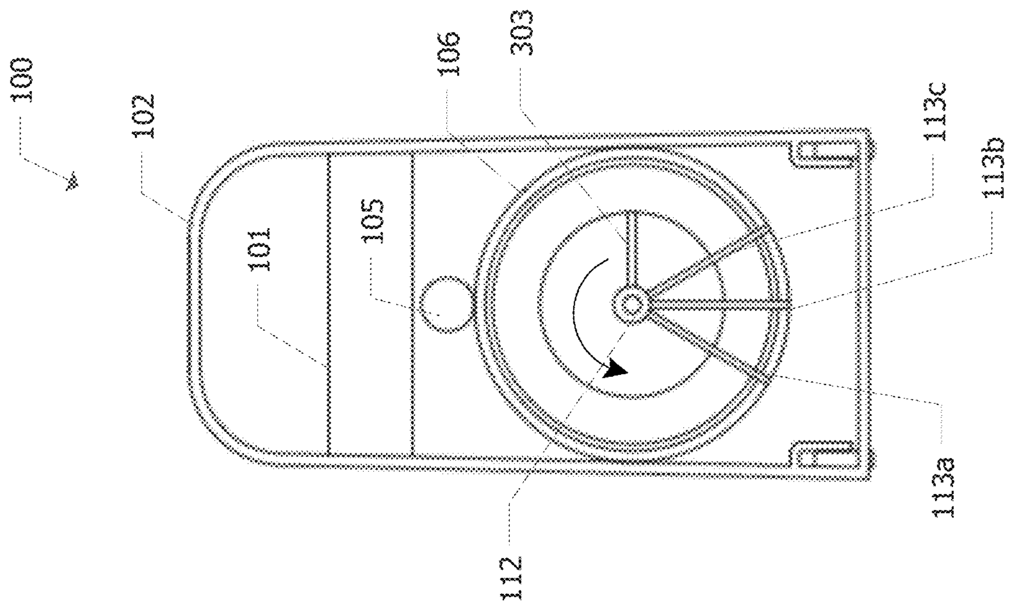
FIG. 6 illustrates another example embodiment of a front view of an article of manufacture for providing motorized drain cleaning and clearing according to the present invention.

FIG. 6 illustrates an example embodiment of a front view of an article of manufacture for providing motorized drain cleaning and clearing according to the present invention. The view of the motorized drain cleaner 100 in FIG. 6 again highlights the rotating drain snake device 303 that rotates about the drain snake outlet shaft 114 as powered by the electric motor 105. The drain snake outlet shaft 114 is shown in its relative position to the\three snake outlet supports 113*a-c* connecting the frame rings 301 of the drain snake drum 106 to the feed neck 112.

FIGS. 7*a-e* illustrate each of the side views from a dashboard enclosure from an example embodiment of an article of manufacture for providing motorized drain cleaning and clearing according to the present invention.

Figure 7A:
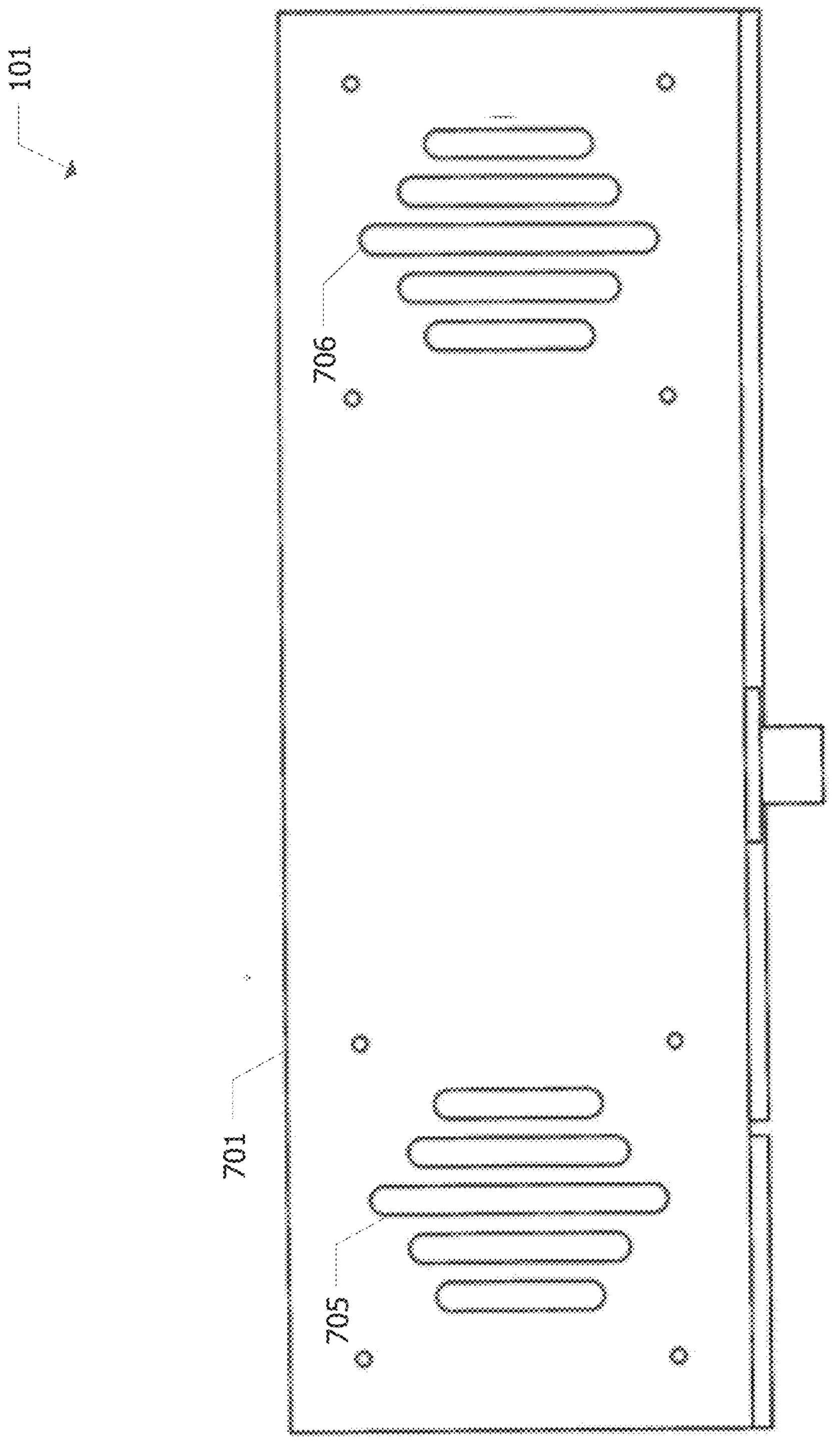
FIGS. 7*a-e* illustrate each of the side views from a dashboard enclosure from an example embodiment of an article of manufacture for providing motorized drain cleaning and clearing according to the present invention.

FIG. 7*a* shows a bottom surface of the dashboard enclosure 701. The dashboard enclosure includes a pair of air vents 705-706 which includes a computer fan for cooling mounted in the box (not shown).

Figure 7B:
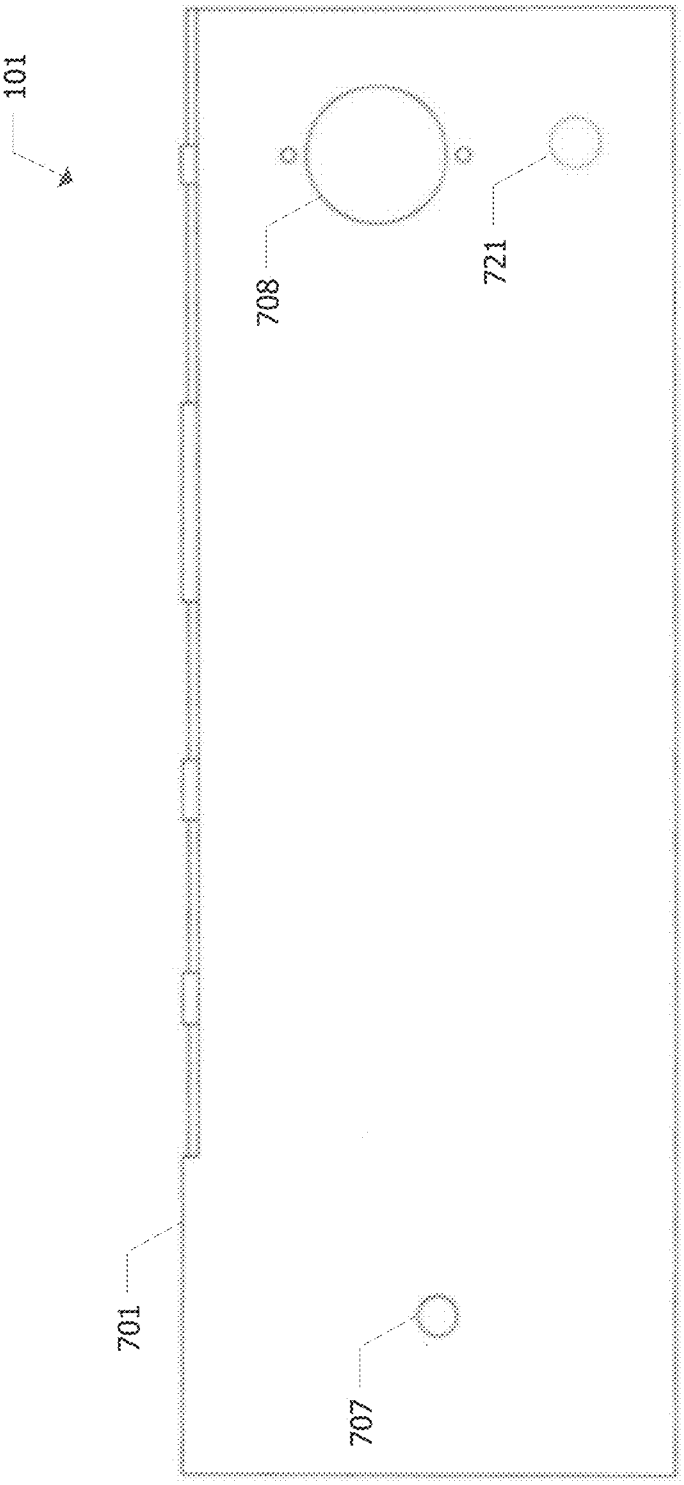

FIG. 7*b* shows a back surface of the dashboard enclosure 701. A female 120 V receptacle outlet 708 allows the technician to plug in hand tools and similar power devices such as drills, saws, and the like. An air switch 708 the motor by using an air foot pedal (not shown). A charging adapter 707 provides a power input for charging battery of the motorized drain cleaner 100.

Figure 7C:
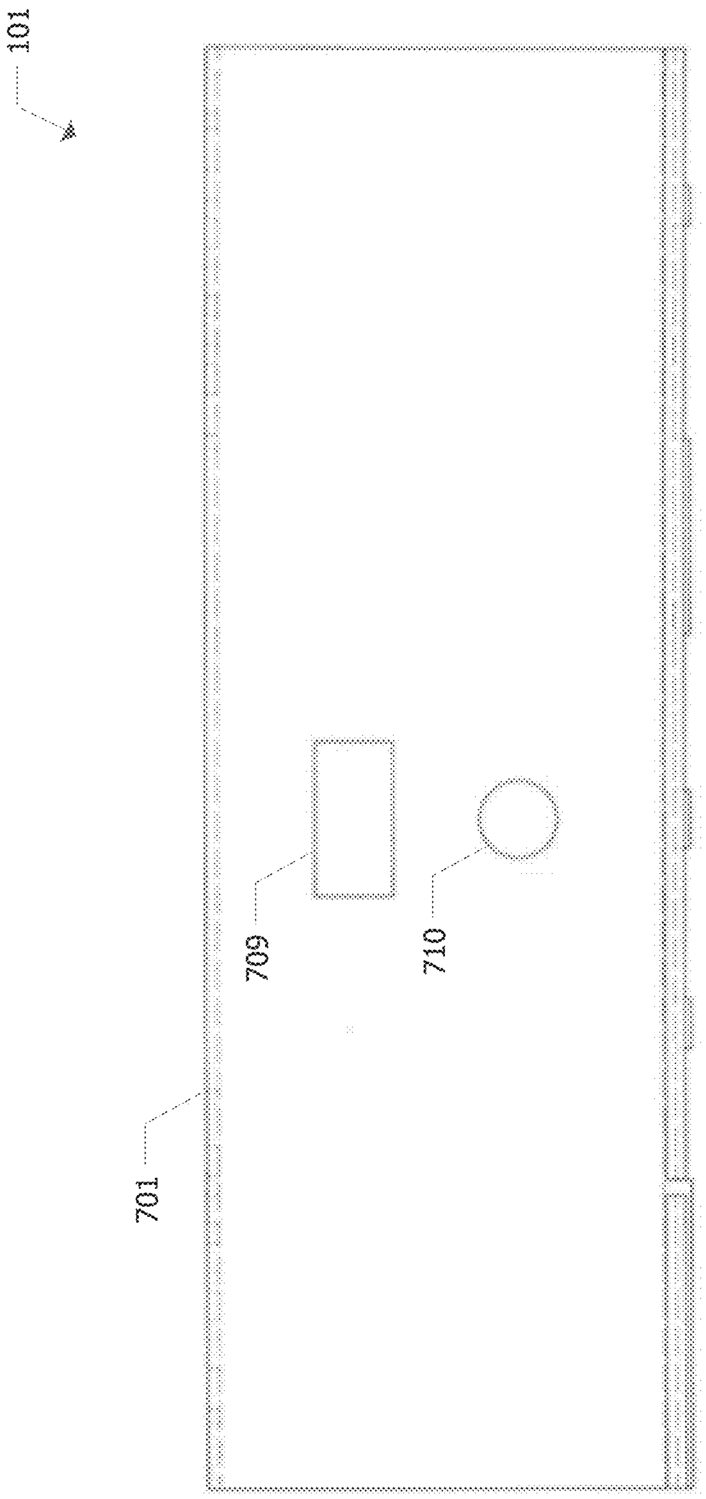

FIG. 7*c* shows a front facing surface of the dashboard enclosure 701. An RPM indicator 709 is provided as a digital light. A speed control 710 is included for adjusting the rotations per minute (RPM) at which the motorized drain cleaner 100 operated. The speed control 710 permits a technician to increase or to decrease the speed of the motor.

Figure 7D:
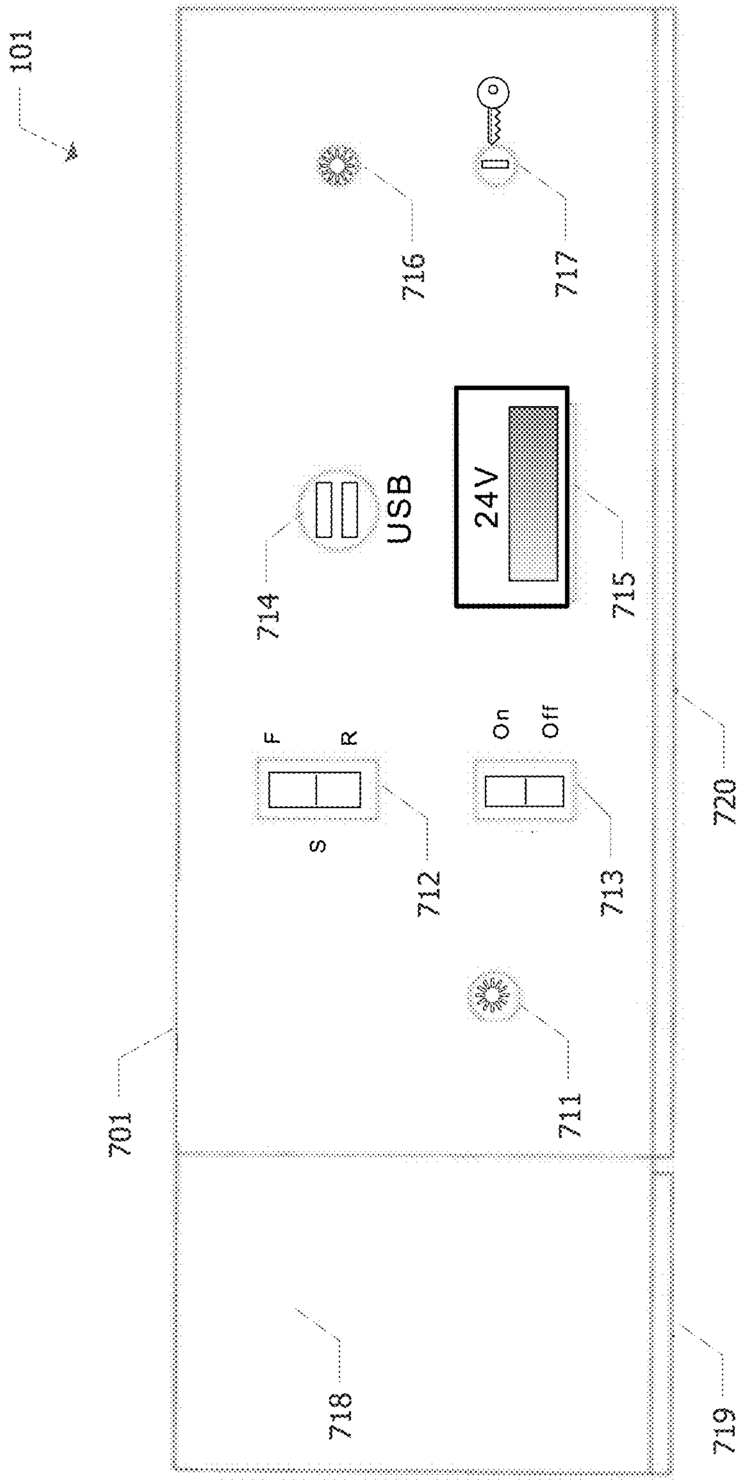

FIG. 7*d* shows a bottom surface of the dashboard enclosure 701. An access door 718 to a male receptacle allows a 110 V extension cord to be plugged into the dashboard enclosure 701. An indicator light 711 that shows electrical voltage is active to an attached extension cord. A rocker switch 712 has a forward, stop, and reverse settings to control the operation of the motor for both forward and reverse rotation. An on/off rocker switch 713 turns the front facing light on or off. A dual USB port 714 allows the technician to plug in a cell phone, iPad, and similar mobile devices. A battery indicator 715 lights with digital bars to display a current state of electrical of the battery. An indicator light 716 shows that the dashboard enclosure 701 is energized and ready to operate. A key on/off switch 717 energizes the dashboard. The key on/off switch 717 has multiple positions that may be changed only when a proper key is within the switch 717. Removal of the key permits the technician to ensure the motorized drain cleaner 100 to be secured when the technician is not operating the device. A pair of piano hinges 719-720 are attached to a cover that may be positioned over the dashboard when not in use.

Figure 7E:
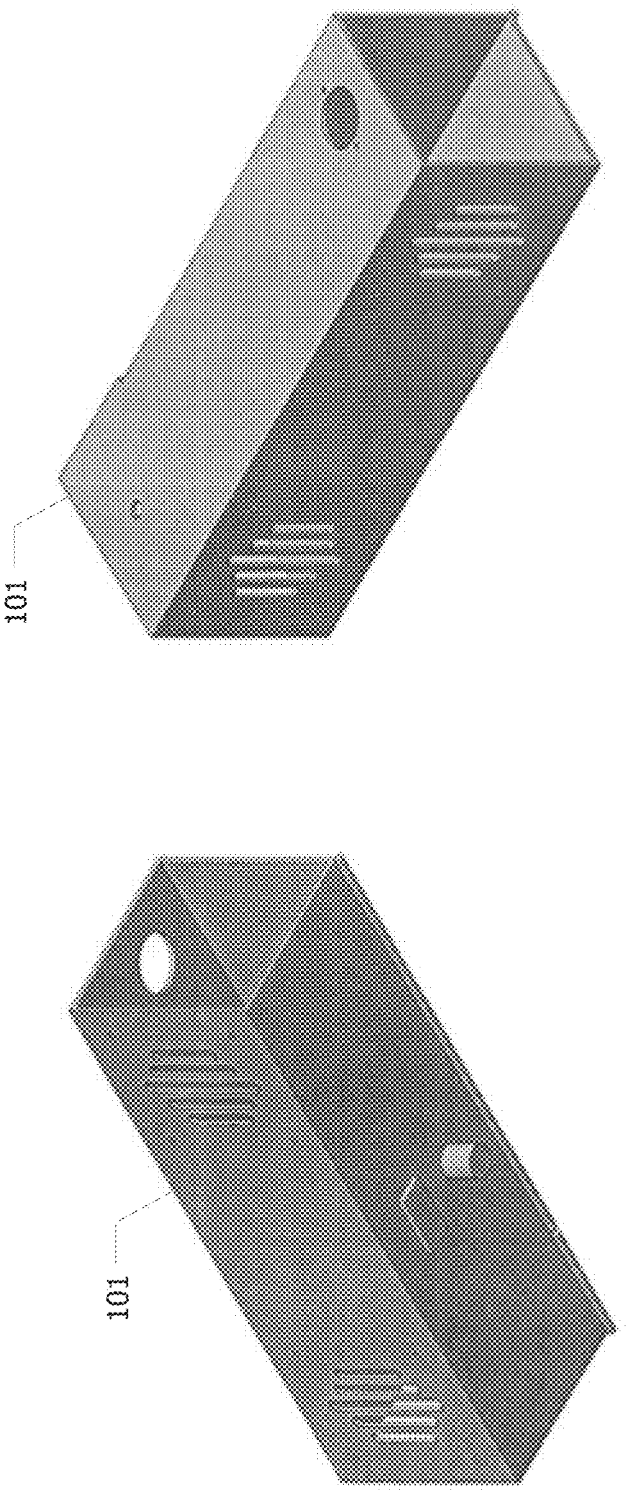

FIG. 7*e* shows a pair of 3D views of the dashboard enclosure 701. The top and bottom sides of the dashboard enclosure 701 are shown in FIG. 7*e*. The two sides of the dashboard enclosure 701 are not shown directly. End caps may be attached as desired once the components are assembled within the dashboard enclosure 701. The dashboard enclosure 701 is mounted and welded between the handles 102 of the motorized drain cleaner 100.

Figure 8:
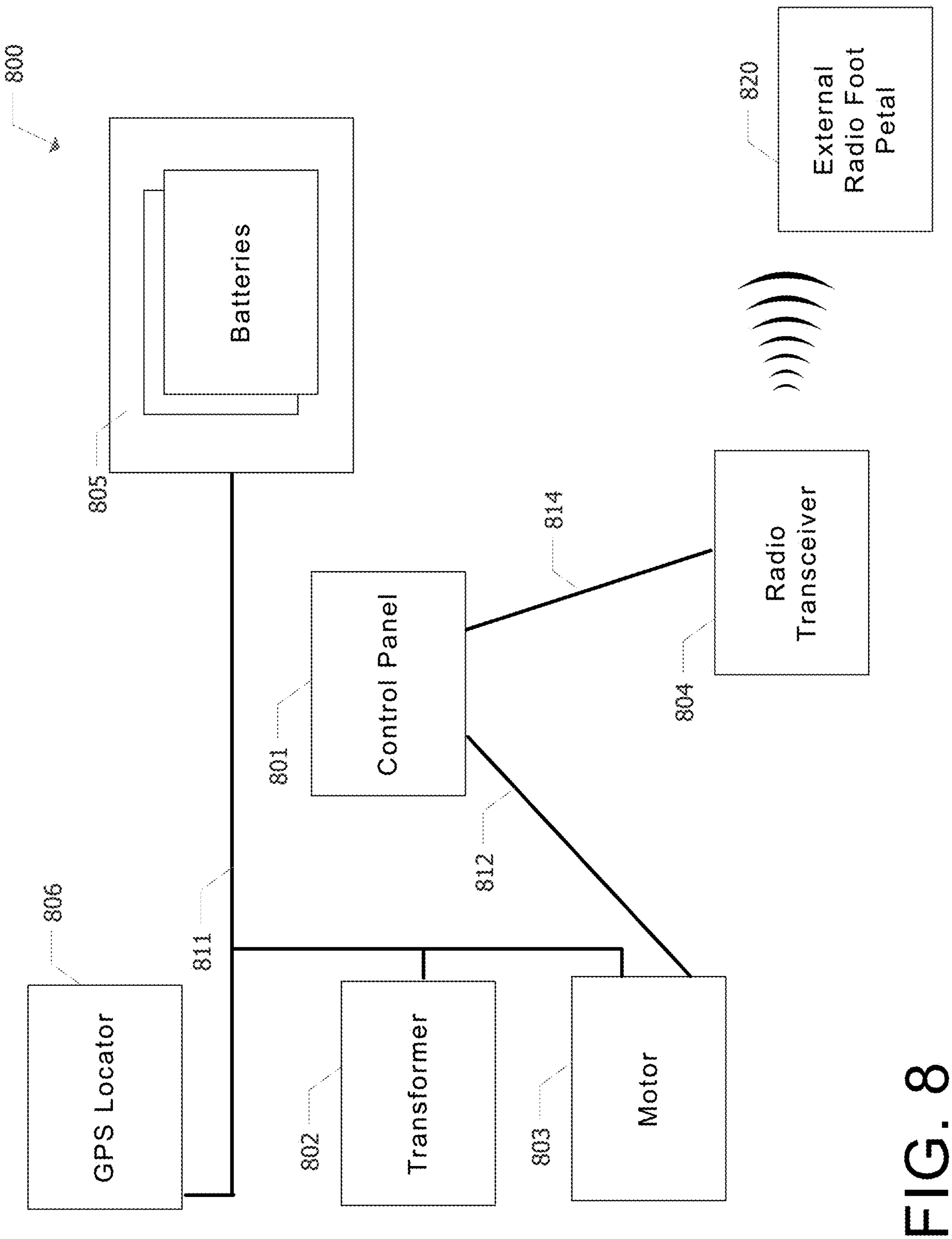
FIG. 8 illustrates an exploded view of components combined to create an article of manufacture for providing motorized drain cleaning and clearing according to the present invention.

FIG. 8 an exploded view of components combined to create an article of manufacture for providing motorized drain cleaning and clearing according to the present invention. The motorized drain cleaner 100 is constructed using components electrically connected that include a control panel 801, a transformer 802, a motor 803, a radio transceiver 804, one or more batteries having recharging circuitry 805, and a GPS locator 806. The transformer 802 generates one or more voltages 811 to be connected to and provide operating voltage to the other components in the circuitry 800.

The control panel 801 contains the input components described above in reference to FIG. 7*a-e*. The control panel 801 is connected to the motor providing a set of signals 812 that instructs the motor 803 whether it is to rotate the drain cleaner tool, in which direction the motor, and thus the drain cleaner is to spin, and the speed of rotation to be operated. The control panel 801 using the multi-position rocker switch 712 and the power on switch 717 (with its key) provide signals to indicate to the motor how it is to operation. The control panel 801 also provides indicator lights 711, 716 to inform an operator that the circuitry within the motorized drain cleaner 100 are energized.

The radio transceiver 804 communicates with an external foot pedal 820 to allow the operator to communicate when to activate the motor 803 and thus the drain cleaner tool. The external radio foot pedal 820 provides a signal when the operator desires the motor to be activated. The radio transceiver 804 sends a signal 814 to the control panel 801 indicating the operators command. This signal 814 is similar to an input signal from a button that was located directly on the control panel 801 that activates the motor 803 when the button is depressed. The radio transceiver 820 and the external radio foot pedal 820 allows this control input to be moved to various locations by the operator when the machine is in use. The control panel 801 contains circuitry to provide the necessary control logic that generates the control signals 812 to the motor 803 in a manner required by the motor 803.

The GPS locator 806 is a self-contained and commercially off the shelf GPL locator device that is powered by the power bus 811 to obtain its position from GPS satellites and provide them for receipt by a computing system the searches for the GPS locator 806 and the motorized drain cleaner 100.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A motorized drain cleaner providing motorized drain cleaning and clearing, the motorized drain cleaner comprises:

a three ring aluminum frame surrounding a rotating drum containing a drain snake drum, the rotating drain snake drum being coupled to a multi-directional motor;

an outside frame coupled to a pair of pivoting wheels at its base, the outside frame having a plurality of frame support arms connecting a handle to a base about the pair of wheels and a control panel between the plurality of frame support arms about the handle;

a pair of pivot support arms coupled between the three ring aluminum frame and the plurality of frame support arms of the outside frame permitting the three ring aluminum frame and the drain snake drum contained therein to pivot upward and downward about the pivot support arms;

the drain snake drum coupled to a feed neck that is connected to a drain snake outlet coupled to the three ring frame supporting the drain snake outlet about a center of rotation of the rotating snake drum; and a drain snake cable having a cutting tool coupled to an outward end and being coupled to the drain snake drum such that rotation of the drain snake drum within the three ring frame causes the drain snake cable to rotate accordingly, the drain snake cable arranged to pass through the drain snake outlet as the drain snake cable exits the drain snake drum.

2. The motorized drain cleaner according to claim 1, wherein the pair of pivoting wheels connect to the outside frame using a pair of shock absorbers.

3. The motorized drain cleaner according to claim 1, wherein the motorized drain cleaner further comprises a radio transceiver communicatively coupled to a remote foot pedal, the foot pedal generates a control signal instructing the motor to rotate the drain snake drum.

4. The motorized drain cleaner according to claim 3, wherein the control panel comprises a three position rocker switch to indicate the motor is to rotate forward, backward, and stop.

5. The motorized drain cleaner according to claim 4, wherein the control panel further comprises a removable key on/off switch to activate and disable operation of the motorized drain cleaner, the removable key on/off switch is in an off position that cannot be changed when the key is not within the removable key on/off switch.

6. The motorized drain cleaner according to claim 3, wherein the motor is coupled to the rotating drain snake drum and the drain snake cable using a belt and pulley coupling a rotating shaft of the motor to a drain snake output shaft.

7. The motorized drain cleaner according to claim 4, wherein the control panel further comprises an electrical power input connector, an output electrical plug, and a pair of USB connectors for providing electrical power to portable devices.

8. The motorized drain cleaner according to claim 7, wherein the motorized drain cleaner further comprises:

a transformer for converting an input AC voltage to an internally used DC voltage; and a rechargeable battery connected to the transformer for charging when the transformer is connected to an AC voltage source, the rechargeable battery configures to provide the internally used DC voltage to the motorized drain cleaner when the AC voltage source is not connected.

9. The motorized drain cleaner according to claim 7, wherein the control panel further comprises a voltage indicator showing the internally used DC voltage available when operating, a first indicator light illuminated when the motorized drain cleaner is energized, and a second indicator light illuminated when an external voltage is connected to the electrical power input connector.

10. The motorized drain cleaner according to claim 9, wherein the motorized drain cleaner further comprises a GPS locator receiver and an external work area light.

* * * * *